(12) United States Patent
Arias Prada et al.

(10) Patent No.: US 10,030,190 B2
(45) Date of Patent: Jul. 24, 2018

(54) ACID SOLUBLE DEFLUIDIZING PILLS

(71) Applicant: M-I L.L.C., Houston, TX (US)

(72) Inventors: Jorge Arias Prada, Katy, TX (US); Steven Philip Young, Cypress, TX (US); Quanxin Guo, Sugar Land, TX (US); John D. Moffitt, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 116 days.

(21) Appl. No.: 14/412,607

(22) PCT Filed: Jul. 1, 2013

(86) PCT No.: PCT/US2013/048934
§ 371 (c)(1),
(2) Date: Jan. 2, 2015

(87) PCT Pub. No.: WO2014/008190
PCT Pub. Date: Jan. 9, 2014

(65) Prior Publication Data
US 2015/0159076 A1 Jun. 11, 2015

Related U.S. Application Data

(60) Provisional application No. 61/787,807, filed on Mar. 15, 2013, provisional application No. 61/787,263, filed on Mar. 15, 2013, provisional application No. 61/667,179, filed on Jul. 2, 2012.

(51) Int. Cl.
| | |
|---|---|
| *E21B 33/13* | (2006.01) |
| *E21B 43/22* | (2006.01) |
| *C09K 8/42* | (2006.01) |
| *C09K 8/575* | (2006.01) |
| *E21B 21/00* | (2006.01) |
| *E21B 43/16* | (2006.01) |
| *E21B 33/138* | (2006.01) |
| *C09K 8/03* | (2006.01) |
| *C09K 8/50* | (2006.01) |
| *C09K 8/516* | (2006.01) |

(52) U.S. Cl.
CPC ........... *C09K 8/424* (2013.01); *C09K 8/03* (2013.01); *C09K 8/42* (2013.01); *C09K 8/426* (2013.01); *C09K 8/50* (2013.01); *C09K 8/516* (2013.01); *C09K 8/5758* (2013.01); *E21B 21/003* (2013.01); *E21B 33/138* (2013.01); *E21B 43/16* (2013.01); *C09K 2208/08* (2013.01)

(58) Field of Classification Search
CPC ...... C09K 2208/08; C09K 8/035; C09K 8/52; C09K 8/12; C09K 8/725; C09K 8/50; C09K 8/516; E21B 21/003; E21B 21/00; E21B 21/062; E21B 33/13; E21B 33/138
See application file for complete search history.

(56) References Cited

U.S. PATENT DOCUMENTS

| | | | |
|---|---|---|---|
| 2003/0195120 A1* | 10/2003 | Halliday | C09K 8/16 507/140 |
| 2006/0157248 A1* | 7/2006 | Hoefer | C09K 8/12 166/300 |
| 2009/0029878 A1* | 1/2009 | Bicerano | C09K 8/035 507/107 |
| 2010/0126723 A1 | 5/2010 | Ali et al. | |
| 2010/0230164 A1 | 9/2010 | Pomerleau | |
| 2010/0298175 A1 | 11/2010 | Ghassemzadeh | |
| 2011/0042088 A1 | 2/2011 | Gassemzadeh et al. | |
| 2011/0278006 A1* | 11/2011 | Sanders | C09K 8/16 166/293 |
| 2015/0021098 A1* | 1/2015 | Kippie | C09K 8/506 175/72 |

FOREIGN PATENT DOCUMENTS

WO      2012/03760 A1    3/2012

OTHER PUBLICATIONS

International Search Report and Written Opinion in corresponding PCT Application No. PCT/US2013/048934 dated Sep. 25, 2013, 12 pages.

* cited by examiner

*Primary Examiner* — Zakiya W Bates
(74) *Attorney, Agent, or Firm* — David J. Smith

(57) ABSTRACT

An acid soluble defluidizing pill for reducing fluid loss in a wellbore is provided that includes an oleaginous or non-oleaginous base fluid; at least one synthetic fiber; and at least one inorganic crystalline fiber; in which one or more of the synthetic fiber and the inorganic crystalline fiber are at least substantially acid soluble.

11 Claims, 3 Drawing Sheets

ACID SOLUBLE DEFLUIDIZING PILLS

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Wellbore fluids may also be used to provide sufficient hydrostatic pressure in the well to prevent the influx and efflux of formation fluids and wellbore fluids, respectively. When the pore pressure (the pressure in the formation pore space provided by the formation fluids) exceeds the pressure in the open wellbore, the formation fluids tend to flow from the formation into the open wellbore. Therefore, the pressure in the open wellbore is typically maintained at a higher pressure than the pore pressure. While it is highly advantageous to maintain the wellbore pressures above the pore pressure, on the other hand, if the pressure exerted by the wellbore fluids exceeds the fracture resistance of the formation, a formation fracture and thus induced mud losses may occur. Further, with a formation fracture, when the wellbore fluid in the annulus flows into the fracture, the loss of wellbore fluid may cause the hydrostatic pressure in the wellbore to decrease, which may in turn also allow formation fluids to enter the wellbore. As a result, the formation fracture pressure typically defines an upper limit for allowable wellbore pressure in an open wellbore while the pore pressure defines a lower limit. Therefore, a major constraint on well design and selection of drilling fluids is the balance between varying pore pressures and formation fracture pressures or fracture gradients though the depth of the well.

Wellbore fluids are circulated downhole to remove rock, and may deliver agents to combat the variety of issues described above. Fluid compositions may be water- or oil-based and may comprise weighting agents, surfactants, proppants, viscosifiers, fluid loss additives, and polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole.

Lost circulation is a recurring drilling problem, characterized by loss of drilling mud into downhole formations. However, in addition to drilling fluids, lost circulation may remain an issue for other wellbore fluids such as including completion, drill-in, production fluid, etc. Fluid loss can occur naturally in earthen formations that are fractured, highly permeable, porous, cavernous, or vugular. These earth formations can include shale, sands, gravel, shell beds, reef deposits, limestone, dolomite, and chalk, among others.

Lost circulation may result from induced pressure during drilling. Specifically, induced mud losses may occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of nearby zones composed of weakly consolidated sands and silts. Another unintentional method by which lost circulation can result is through the inability to remove low and high gravity solids from fluids. Without being able to remove such solids, the fluid density can increase, thereby increasing the hole pressure, and if such hole pressure exceeds the formation fracture pressure, fractures and fluid loss can result.

Various methods have been used to restore circulation of a drilling fluid when a lost circulation event has occurred, particularly the use of lost circulation material (LCM) to seal or block further loss of circulation. These materials may generally be classified into several categories: surface plugging, interstitial bridging, and/or combinations thereof. In addition to traditional LCM pills, polymers that crosslink or absorb fluids and cement or gunk squeezes have also been employed.

Accordingly, there exists a continuing need for developments for new LCM treatments that may be used during a lost circulation event so that circulation may be more readily resumed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, an acid soluble defluidizing pill for treating fluid loss in a wellbore is provided that includes an oleaginous or non-oleaginous base fluid; at least one synthetic fiber; and at least one inorganic crystalline fiber; in which one or more of the synthetic fiber and the crystalline fiber are at least substantially acid soluble.

Other embodiments of the present disclosure are directed to methods of reducing loss of wellbore fluid in a wellbore to a formation that include introducing into the wellbore an acid soluble defluidizing pill containing one or more synthetic fibers, and one or more inorganic crystalline dfibers, wherein one or more of the synthetic fiber and the inorganic crystalline fiber are at least substantially acid soluble, and applying pressure to the slurry to decrease the fluid content of the defluidizing pill, wherein the defluidizing pill plugs or consolidates one or more regions of the wellbore.

Other aspects and advantages of the invention will be apparent from the following description and the appended claims.

DETAILED DESCRIPTION

Figure 1:
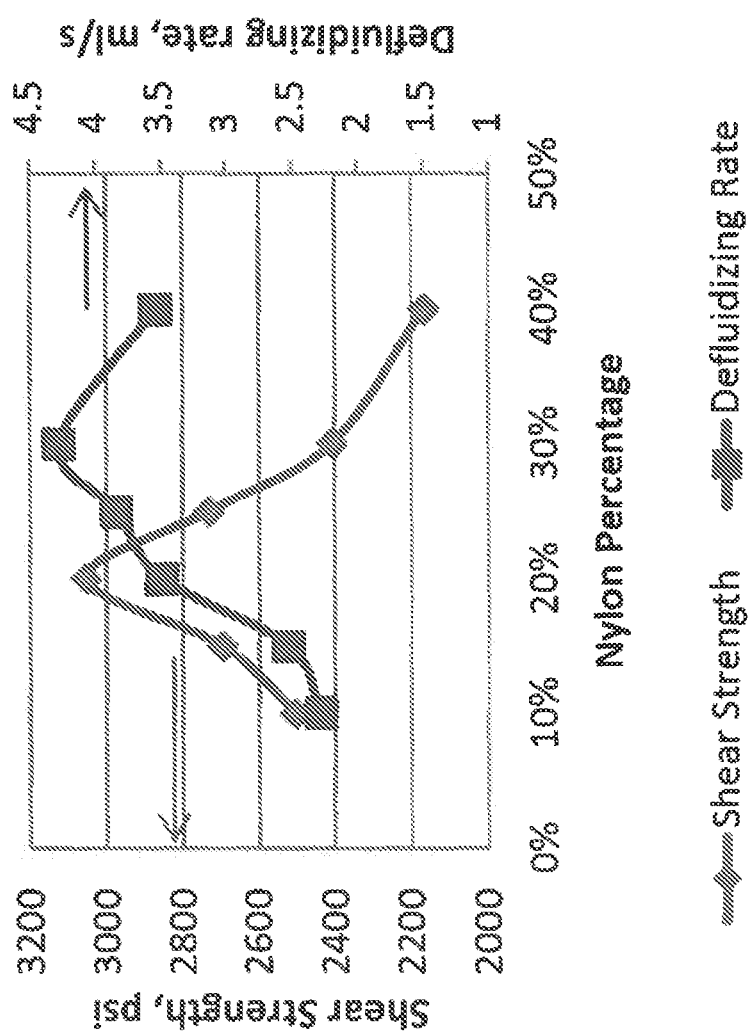
FIG. 1 shows results of shear strength of the samples of Example 1.

Embodiments disclosed herein relate to engineered fluid loss control compositions. In particular, embodiments disclosed herein relate to defluidizing pills that may be defluidized (dewatered or deoiled) to leave behind a plug or seal as a lost circulation treatment. As used herein, the term "pill" is used to refer to a relatively small quantity (typically less than 200 bbl) of a special blend of wellbore fluid to accomplish a specific task that the regular wellbore fluid cannot perform. In one specific embodiment, the defluidizing pill may be used to plug a "thief zone," which simply refers a formation into which circulating fluids can be lost.

By plugging porous or vugular zones of the formation, fluid loss compositions containing engineered combinations of fibrous materials may provide an immediate blockage, preventing further fluid loss and facilitating further drilling operations. By utilizing the unique properties of three-dimensional shapes of the fibrous materials and the combination of fiber types, the materials may interact synergistically to form a seal that arrests the flow of wellbore fluids into the formation. As used herein, the terms "fiber" and "fibrous" are used to denote a high aspect ratio molecular or macromolecular structure, which may have a length greater than either its diameter or width (i.e., a length that is greater than the other two dimensions).

Without being limited by any particular theory, it is believed that as fibrous materials present in the defluidizing pill enter fractures in the formation, the fibers trap and entangle other particles present in the surrounding fluid, creating an impermeable barrier that prevents further fluid loss to the formation. These fibers may act to create a heterogeneous three-dimensional network that can trap particulates of varying sizes, generating a filtercake that prevents fluid flow in or out of the wellbore.

In embodiments, the defluidizing pill may include a combination of one or more synthetic fibers and inorganic crystalline fibers, and may optionally include at least one particulate weighting agent and/or natural fiber. In other embodiments, defluidizing pills may include a number of other additives known to those of ordinary skill in the art of wellbore fluid formulations, such as wetting agents, viscosifiers, surfactants, dispersants, interfacial tension reducers, pH buffers, mutual solvents, thinners, thinning agents, rheological additives and cleaning agents.

Upon emplacement within the wellbore, a pill may be defluidized and lose a substantial portion of the base fluid to the formation such materials present in the pill form a plug or seal having sufficient compressive and shear strength for the particular application. Advantageously, upon placing the pill in the wellbore, the pill may be defluidized to lose a substantial portion of the base fluid to the formation such that the fiber blend of the present disclosure may form a plug or seal having sufficient compressive strength for the particular application, and which may increase the tensile strength of the rock.

In one or more embodiments, the defluidizing pill may be completely or at least partially acid soluble, allowing the pill to be placed to stop fluid loss during drilling operations and then subsequently removed prior to completion operations. Specifically, according to embodiments, one or more of the components may be substantially acid soluble. As used herein, "acid soluble" refers to the ability of a material to dissolve in/upon contact with an acid. "Substantially acid soluble" is defined to mean that at least 75% of a given component will dissolved in/upon contact with acid. The selection of fibers may have a significant affect on the efficiency of the fluid loss compositions in both performance (defluidization and resulting plug strength) and acid solubility.

Synthetic Fibers

One or more embodiments may incorporate at least one synthetic fiber type into the defluidizing pills. In particular embodiments, the synthetic fibers may include high aspect ratio polymeric fibers. In some embodiments, acid soluble synthetic fibers may include polyamides such as nylon 6, nylon 6,6, and combinations thereof.

The diameter of the synthetic fiber has been identified as parameter that may determine both the performance of the synthetic fiber as a lost circulation material, and a variable that may be used to tune the rate of dissolution of the fiber upon exposure to acidic media. As an example, the denier of the nylon fiber, which is the mass in grams of 9,000 meters of a selected fiber, may be used as a guide for determining the acid solubility of the fiber. For example, a higher denier nylon may be more soluble than a lower denier nylon. For example, in various embodiments, a denier of at least 2, 4, 6, or 8 may be selected. Also affecting acid solubility may be temperature. For example, a sample may have a relatively low acid solubility at room temperature, but upon exposure to elevated temperatures, such as 100° C. and greater, the solubility may be increased to substantially or completely soluble.

In other embodiments, the natural fiber may be a mineral fiber such as MAGMA™ fiber available from Lost Circulation Specialists, Inc., Casper, Wyo., USA. This fiber is 99.8% acid soluble and thermally stable at temperatures up to 1,800 degrees. The specific gravity of those fibers is 2.6 with no tendency to float. MAGMA™ fiber is an inert non-damaging material towards the environment with an LC-50 of one million. MAGMA™ fiber is available in a "fine" form having a length of from about 0.1 to about 4 mm and a "regular" form having a length of from about 4 to about 20 mm with an average length of about 10 to about 16 mm. The fiber diameters of both grades of MAGMA™ fiber ranges from about 5 to about 15 microns with an average diameter of about 7 to about 10 microns. MAGMA™ fibers are obtained as mixtures of multiple sizes. Fiber for use in the Invention may optionally be cut from either form as appropriate.

In other embodiments, the synthetic fiber may be a mineral fiber (also referred to in the art as mineral wool or man-made mineral fibers) such a fiber formed from various oxide materials such as $SiO_2$, $Al_2O_3$, CaO, MgO, and/or $Fe_2O_3$, used in combination in an extrusion spun process to form fibers. Such mineral fibers may be formed, for example, by melting/extruding blast furnace slug and/or basalt (or other mineral containing materials), alone or in combination. Generally, mineral fibers may be formed from natural or synthetic mineral sources, and then may be extruded, spun, or otherwise formed into fiber form.

Such fibers may be formed having a range of diameters and a range of lengths, depending on the extrusion process, and whether it is desired to "cut" to the desired length. For example, one example of such fiber is the MAGMA FIBER®, which is available in a "fine" form having a length of from about 0.1 to about 4 mm and a "regular" form having a length of from about 4 to about 20 mm with an average length of about 10 to about 16 mm. The fiber diameters of both grades of MAGMA FIBERS® may range from about 5 to about 15 microns with an average diameter of about 7 to about 10 microns.

In other embodiments, the synthetic fibers may be selected from polyaramids, polyamides, polyesters, polyethylene terephthalate, polytriphenylene terephthalate, polybutylene terephthalate, polylactic acid, poly(lactic-co-glycolic acid), polyglycolic acid, poly(ε-caprolactone) and combinations thereof. Polyolefins may include, for example, propylene based homopolymers, copolymers, and multi-block interpolymers, and ethylene based homopolymers, copolymers, and multi-block interpolymers, and combinations thereof.

The various synthetic fibers may be added to the defluidizing pill in an amount ranging from 0.5 ppb to 15 ppb in some embodiments; however, more or less may be desired depending on the particular application. In some embodiments, synthetic fibers may be added to the defluidizing pill in a range of 2 ppb to 12 ppb. Further, in one or more embodiments, nylon fibers may be used in combination with mineral fibers. In such embodiments, the amount of each fiber may be individually selected from these ranges, and the total combined amount may be in excess of 15 ppb. In such applications, it also may be desirable for the amounts of each fiber type to be in excess of these ranges, as noted above.

In embodiments, the synthetic fibers may have lengths within the range of 100 µm to 20 mm. In other embodiments the synthetic fibers may have lengths within the range of 500 µm to 15 mm. In particular embodiments, a nylon fiber having a length in the range of 1 to 10 mm may be used, and a mineral fiber having a length of 5 to 15 mm may be used.

The diameter of the fiber may be used to control the extent and rate of dissolution of the synthetic fiber upon exposure to acidic fluids. In embodiments, the diameter of the fibers may fall within the range of 0.1 µm to 60 µm. In yet another embodiment, the diameter of the fibers may be within the range of 0.5 µm to 50 µm. In particular embodiments, a nylon fiber having a diameter in the range of 20 µm to 50 µm may be used, and a mineral fiber having a diameter of 1 to 15 µm may be used.

Inorganic Crystalline Fibers

In embodiments, the defluidizing pills of the present disclosure may include an inorganic crystalline fiber component that may exhibit a greater structural rigidity to that of the synthetic fiber component.

In one or more embodiments, the inorganic crystalline fiber component may be aragonite, one of the predominant crystalline forms of calcium carbonate. Aragonite exhibits an acicular orthorhombic structure with typical crystal habits of twinned hexagonal prismatic crystals, as well as a number of elongated crystal shapes including curved bladed, steep pyramidal, chisel-shaped, branched, and coral or worm-like structures. Because aragonite is composed of calcium carbonate, the material is acid soluble, releasing carbon dioxide upon dissolution. In other embodiments, inorganic crystalline fibers may be polymorphs of calcium carbonate such as vaterite, or other acid soluble minerals (e.g, magnesium carbonate) having high aspect ratio crystal habits or acicular form.

Inorganic crystalline fibers may be added to the pill in an amount that may range from 10 ppb to 40 ppb in some embodiments. In other embodiments crystalline fibers may be added at a range of 15 ppb to 30 ppb In embodiments, the crystalline fibers may have lengths within the range of 100 µm to 20 mm. In other embodiments the crystalline fibers may have lengths within the range of 500 µm to 10 mm.

The diameter of the fiber may be used to control the extent and rate of dissolution of the crystalline fiber upon exposure to acidic fluids. In embodiments, the diameter of the fibers may fall within the range of 0.1 µm to 1 µm. In yet another embodiment, the diameter of the fibers may be within the range of 0.5 µm to 0.75 µm.

Natural Fibers

Further, in addition synthetic fiber and inorganic crystalline fibers, the defluidizing pill may optionally include a natural fiber to aid in suspension and viscosification, as well as provide additional compressive strength to the resulting plug or seal. As used herein, the term "natural fiber" refers to an additive formed from a naturally occurring material that has an elongated structure, which may be spun into filaments or used as a component of a composite material such as paper. Similar to the synthetic fibers structure described above, the natural fibers may be inert with respect to the base fluid and to the other defluidizing pill components.

Natural fibers generally include vegetable fibers, wood fibers, animal fibers, and mineral fibers. In embodiments, the natural fiber component used in the pills may include cellulose, or other glucose-based polysaccharides. Cellulose from wood pulp has typical chain lengths between 300 and 1700 units, whereas cotton and other plant fibers as well as bacterial celluloses have chain lengths ranging from 800 to 10,000 units. No limit on the type of natural fibers (or cellulose in particular) that may be used in the pills of the present disclosure is intended; however, in a particular embodiment, cellulose fibers may be either virgin or recycled, extracted from a wide range of plant species such as cotton, straw, flax, wood, etc.

Additionally, it is also within the scope of the present disclosure that such cellulosic materials may be combined, pressed together to form larger sheets. Some commercial sources of cellulose (paper) may optionally be coated to render the sheets hydrophilic or hydrophobic; however, such coatings are optional. The sheets may then be finely divided for use in the slurries disclosed herein. In particular embodiments, the amount of natural fibers in a defluidizing pill may range from 30 to 60 percent by weight; however, more or less may be used in other embodiments.

Natural fibers may be added to the pill in an amount that may range from 1 ppb to 20 ppb in some embodiments. In other embodiments, natural fibers may be added to the defluidizing pill in an amount that may range from 3 ppb to 12 ppb. In one or more embodiments, the natural fibers may be added in an amount that is less than 10 percent by weight of the total formulation.

In embodiments, the natural fibers may have lengths within the range of 100 µm to 20 mm. In other embodiments the natural fibers may have lengths within the range of 500 µm to 10 mm.

The diameter of the fiber may be used to control the extent and rate of dissolution of the natural fiber upon exposure to acidic fluids. In embodiments, the diameter of the fibers may fall within the range of 0.1 µm to 1 µm. In yet another embodiment, the diameter of the fibers may be within the range of 0.5 µm to 0.75 µm.

Base Fluids

The base fluid may be an aqueous fluid or an oleaginous fluid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts. Additionally, brines that may be used in the pills disclosed herein may be natural or synthetic, with synthetic brines tending to be much simpler in constitution. In one embodiment, the density of the pill may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oleaginous fluid may be a liquid, more preferably a natural or synthetic oil, and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. Selection between an aqueous fluid and an oleaginous fluid may depend, for example, the type of drilling fluid being used in the well when the lost circulation event. Use of the same fluid type may reduce contamination and allow drilling to continue upon plugging of the formation fractures/fissures, etc.

Particulate Weighting Agents

In addition to the multi-fiber formulations, it is also within the scope of the present disclosure that particulate weighting agents may also be incorporated into the defluidizing pills. Particulate-based treatments may include use of particles frequently referred to in the art as weighting materials. Particulate weighting agents that may be used in accordance with the present disclosure may include any material that may aid in weighting up a fluid to a desired density.

Examples of particulate weighting agents suitable for use in the present disclosure include graphite, micas, proppant materials such as sands or ceramic particles and combinations thereof. As is known in the art, control of density may be desired to balance pressures in the well and prevent a blowout. To prevent a blowout, the fluid in the well may have a density effective to provide a greater pressure than that exerted from the formation into the well. However, densities should not be too high or else they may cause further lost circulation. Thus, it is often desirable to modify the density of a defluidizing pill with weighting agents to balance the pressure requirements of the well.

Weighting agents may be selected from one or more of the materials including, for example, barium sulfate (barite), ilmenite, hematite or other iron ores, olivine, siderite, and strontium sulfate. In other embodiments, the particulate weighting agent may be composed of an acid soluble material such as calcium carbonate (calcite), magnesium oxide, dolomite, and the like. Additionally, it is also within the scope of the present disclosure that the fluid may also be weighted up using salts (either in a water- or oil-based pill) such as those described above with respect to brine types. One having ordinary skill in the art would recognize that selection of a particular material may depend largely on the density of the material as typically, the lowest wellbore fluid viscosity at any particular density is obtained by using the highest density particles.

The particle size of the particulate weighting agents may be selected depending on the particular application, the level of fluid loss, formation type, and/or the size of fractures predicted for a given formation. The particles may range in size from nanoscale to a macroscale, for example. In an embodiment, the particles may be approximately spherical and have a diameter that ranges from 100 nanometers to 3000 microns, and 25 to 1500 microns in another embodiment. Selection of size may depend on the level of fluid loss, the fracture width, the formation type, etc. The size may also depend on the other particles selected for use in the defluidizing pill.

The amount of particulate weighting agent present in the defluidizing pill may depend on the fluid loss levels, the anticipated fractures, the density limits for the pill in a given wellbore and/or pumping limitations, etc. In some embodiments, the particulate weighting agents may be added to the pill such that the final density of the fluid may range from 9 ppg up to 23 ppg in some embodiments; however, more or less may be desired depending on the particular application.

As mentioned above, the components disclosed herein may be combined to form a wellbore fluid, and in particular a defluidizing pill. Upon introduction into the wellbore by spotting a slug or pill adjacent a permeable formation, the pill may be defluidized, depositing a plug or seal of the fiber-containing composition (and other optional particulate weighting agents), reducing or blocking the efflux of fluid into the formation. Upon sealing the permeable formation, circulation of the drilling fluid may continue and a traditional filter cake may be formed on top of the defluidized pill reinforcing the seal on the wellbore walls.

While defluidizing pills may stop losses when drilling a well, they may introduce limitations later during the production stage. In embodiments described herein, the defluidizing pills may be formulated from acid soluble components such that the defluidizing pill may form a seal having high shear strength in a downhole fracture, and then be removed at a later time with the application of an acidic treatment such as a breaker fluid.

The fibers and solids are added to the treatment fluid, such as a water- or oil-based wellbore fluid, in any order with any suitable equipment to form the defluidizing pill. The fluid containing the fiber blend, and particulate solids if present, is mixed before pumping downhole. The fiber blend may be added and mixed and then particulate solids or additional fibers may be added and mixed, or vice versa, or both fibers and particulate solids may be added before mixing. In other embodiments, the fiber blend and optional particulate solids may be added to the fluid while pumping using specialized shakers. The defluidizing composition may be added in a discrete amount, for example as a pill, or added continuously until lost circulation is reduced to an acceptable level. The defluidizing composition is preferably spotted adjacent to the location of the lost circulation using methods known in the art.

Spotting a defluidizing pill adjacent a permeable formation may be accomplished by methods known in the art. For example, the "thief" or permeable formation will often be at or near the bottom of the wellbore because when the permeable formation is encountered the formation will immediately begin to take drilling fluid and the loss of drilling fluid will increase as the permeable formation is penetrated eventually resulting in a lost circulation condition. In such situations, the LCM slurry may be spotted adjacent the permeable formation by pumping a slug or pill of the slurry down and out of the drill pipe as is known in the art. It may be, however, that the permeable formation is at a point farther up in the wellbore, which may result, for example, from failure of a previous seal. In such cases, the drill pipe may be raised as is known in the art so that the pill or slug of the LCM slurry may be deposited adjacent the permeable formation. The volume of the slug of LCM pill that is spotted adjacent the permeable formation may range from less than that of the open hole to more than double that of the open hole.

Defluidization of the LCM slurry may be accomplished either by hydrostatic pressure or by exerting a low squeeze pressure as is known in the art. Hydrostatic pressure will complete the seal; however, a low squeeze pressure may be desirable because incipient fractures or other areas of high permeability can be thereby opened and plugged immediately, thus reinforcing the zone and reducing or avoiding the possibility of later losses. After the defluidization is completed, the drilling fluid may be recirculated through the wellbore to deposit a filtercake on the formation seal, and drilling may be resumed. Injection of the particles into the formation may be achieved by an overbalance pressure (i.e., an overbalance pressure greater than the formation pressure). While in particular embodiments, the injection pressure may range from 100 to 400 psi, any overbalance pressure level, including less than 100 psi or greater than 400 psi may alternatively be used. The selection of the injection pressure may simply affect the level of injection of the pill into the formation.

In some instances, it may be necessary to use more than one LCM pill. Such need may arise when the first pill was insufficient to plug the fissures and thief zone or was placed incorrectly. Further, in some instances, the first pill may have sufficiently plugged the first lost circulation zone, but a second (or more) lost circulation zone also exists needed treatment.

It is also within the scope of the present disclosure that one or more spacer pills may be used in conjunction with the pills of the present disclosure. A spacer is generally characterized as a thickened composition that functions primarily as a fluid piston in displacing fluids present in the wellbore and/or separating two fluids from each other.

Further, based on the presence of one or more substantially acid soluble components in the pill formulation, the filtercake formed on the wellbore well may be removed by an acid wash. Thus, the formulation of the present disclosure may be particularly desirable for use when drilling through a producing region of the well and fluid losses are experienced. The defluidizing pill may be pumped into the well to seal off the formation, so that further drilling and/or completion operations may continue. Upon conclusion of all completion operations, the circulation of an acid wash (such as HCl or other acids known in the art of wellbore cleanup operations) may be used to at least partially dissolve some of the filtercake remaining on the wellbore walls. Upon cleanup of the well, the well may be put into production.

EXAMPLES

The following example is provided to further illustrate the application and the use of the methods and compositions of the present disclosure.

Example 1—Shear Strength and Defluidizing Rate of the Defluidizing Pill as a Function of Synthetic Fiber Concentration The shear strength of a defluidizing composition was assayed as a function of the weight percent of nylon. Samples were prepared by combining 5 wt % of the natural fiber cellulose, 40 wt % of the inorganic crystalline fiber aragonite, and varying the weight percentages of the synthetic fiber nylon from 10 to 40 wt %. As seen in the FIG. 1, the composition reached a shear strength maximum at 20 wt % nylon and a maximum defluidizing rate at 30 wt % nylon.

Example 2—Acid Solubility of Cellulose-Containing Compositions

Figure 2:
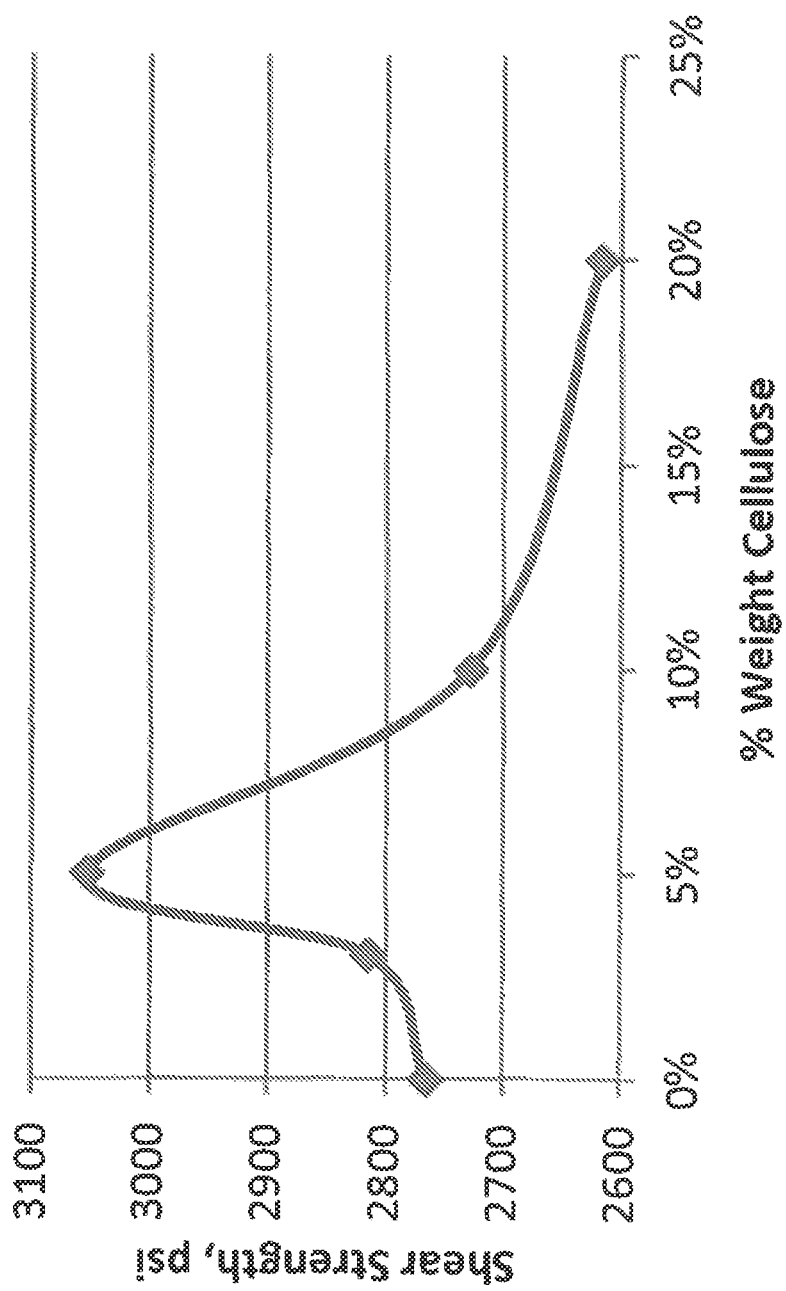
FIG. 2 shows acid solubility with varying cellulose in Example 2.

The acid solubility of the defluidizing compositions containing varying percent weight of cellulose was assayed. As shown in Table 2 and illustrated in FIG. 2, the natural fiber cellulose may be incorporate into the defluidizing composition up to 5 wt % while remaining >90% soluble in 15% hydrochloric acid.

TABLE 1

Acid solubility at 230° F. of a defluidzing formulation as a function of cellulose composition.

| Cellulose Composition | % Acid Solubility | |
|---|---|---|
| 0% | 83 | 99 |
| 3% | 79 | 96 |
| 5% | 78 | 94 |

Figure 3:
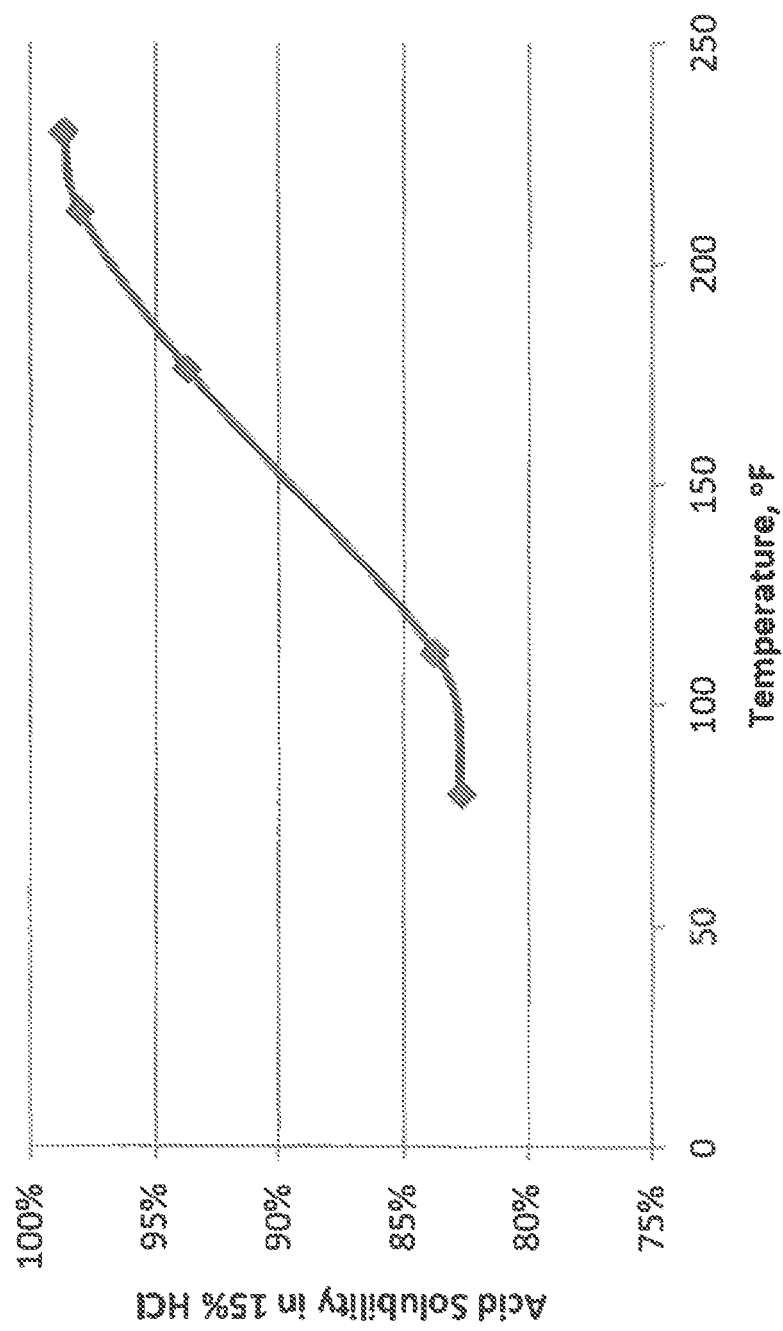
FIG. 3 shows solubility as function of temperature.

Example 3—Acid Solubility of Defluidizing Compositions Containing Synthetic and Crystalline Fiber The solubility of a composition containing 20 wt % of the synthetic fiber nylon and 40 wt % of the crystalline fiber aragonite in 15% hydrochloric acid was measured as a function of increasing temperature and the results were plotted in FIG. 3. As shown in FIG. 3, the solubility of the composition reached a maximum of 98% solubility at ~212° F.

Example 4—Fracture Sealing and Pumpability

In order to assay the ability of the composition to seal fractures samples were prepared containing varying solids volume fraction (SVF) of a defluidizing formulation containing 20 wt % nylon, 40 wt % aragonite, and 5 wt % cellulose.

Tests were performed in a modified lost circulation cell. The cell was equipped with a cylinder approximately 50 mm high having a 5 mm slot. The experimental apparatus consisted essentially of a high-pressure, high-temperature fluid loss cell equipped with a cylinder at the bottom. Pressure was applied from the top of the cell onto sample formulations placed within the cell (as in a standard fluid loss experiments known in the art). A valve at the bottom was closed, and a cylinder having a slot was placed inside the cell. 500 mL of fiber-laden fluid was poured into the test cell, and the cell was closed and pressurized to 100 psi. Once the cell was pressurized, the bottom valve was opened quickly enough to eliminate filtration of fibers through the bottom pipe. If the slot was sealed, pressure was increased from 100 psi to 1500 psi, in steps of 50 psi. The pressure was held constant for at least 30 minutes, unless no plug formed or the plug failed. Mud loss monitored by collecting filtrate in a container. The container was placed on a balance connected to a computer, allowing one to record fluid loss over time.

In addition to verifying that the sample formulations would seal a 5 mm slot, the samples were also tested for the ability to be pumped through a through a Silverson pump that was used to approximate pumping the material through a drill string.

Results from the two tests are shown in Table 3. It was noted that, while the formulation containing an SVF of 42 ppb created a strong seal over the 5 mm slot that was hard to physically remove and required acid treatment to dissolve, the high concentration of the fiber mixture could not be pumped through the Silverson pump. However, when the concentration was reduced down to 15 ppb (2% SVF) the new material remained pumpable, yet was still effective in sealing the 5 mm slot.

TABLE 2

Pumpability of defluidizing compositions as a function of solids volume fraction for sample formulations in Example 4.

| Solids Volume Fraction | ppb | Sealed 5 mm slot? | Pumpable through Silverson Pump? |
|---|---|---|---|
| 6% | 42 | Yes | No |
| 5% | 35 | Yes | No |
| 4% | 28 | Yes | No |
| 3% | 21 | Yes | No |
| 2% | 15 | Yes | Yes |

Applicant has discovered that, by controlling the ratio of loss control materials based upon their microscopic shapes, improved packing within fractures and loss control performance can be obtained. Because of the interweaving of the fiber components additives and optional particulate weighting agents, reduced amounts of each of the individual components are necessary to plug fissures within the formation, with that added benefit that the resulting fluid remains pumpable thorough conventional drill strings.

Further, while not all fibers are capable of blocking fluid loss under given conditions, as the selection and use of the wrong fiber can cause great complications in mixing and pumping and ultimately with no blocking effect to cure losses, the applicant has identified materials that are both capable of reducing or eliminating fluid loss in a subterranean formation, the fiber materials may also be dissolved upon exposure to acid to such a degree that the seal formed by fiber blend may be partially or completely removed prior to production operations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of reducing loss of wellbore fluid in a wellbore to a formation, comprising:
   introducing into the wellbore an acid soluble defluidizing pill comprising one or more synthetic fibers, and one or more inorganic crystalline fibers, wherein one or more of the synthetic fiber and the inorganic crystalline fiber are at least substantially acid soluble; and
   applying pressure to the defluidizing pill to decrease a fluid content of the defluidizing pill, wherein the defluidizing pill plugs or consolidates one or more regions of the wellbore.

2. The method of claim 1, wherein both the synthetic fiber and the crystalline fiber are substantially acid soluble.

3. The method of any of claim 1, wherein defluidizing pin further comprises at least one particulate weighting agent.

4. The method of claim 1, wherein the inorganic crystalline fiber comprises aragonite.

5. The method of claim 1, further comprising a natural fiber.

6. The method of claim 1, wherein the synthetic fiber comprises at least one of nylon or an extruded mineral wool fiber.

7. The method of claim 1, further comprising:
   introducing at least one spacer pill is introduced into the wellbore before introducing the defluidizing pill.

8. The method of claim 1, further comprising:
   introducing at least one spacer pill after the defluidizing pill is introduced into the wellbore.

9. The method of claim 1, further comprising:
   introducing into the wellbore a second defluidizing pill comprising a synthetic fiber structure and an inorganic crystalline fiber; and
   applying pressure to the second defluidizing pill to decrease a fluid content of the second defluidizing pill.

10. The method of claim 1, further comprising: circulating an acid wash in the wellbore after introducing the defluidizing pill.

11. The method of claim 1, wherein the one or more synthetic fibers comprises nylon.

* * * * *